United States Patent
Heinla

(10) Patent No.: US 9,197,678 B2
(45) Date of Patent: Nov. 24, 2015

(54) METHOD AND SYSTEM FOR DATA TRANSMISSION

(75) Inventor: Ahti Heinla, Tallinn (EE)

(73) Assignee: Skype, Dublin (IE)

( * ) Notice: Subject to any disclaimer, the term of this patent is extended or adjusted under 35 U.S.C. 154(b) by 597 days.

(21) Appl. No.: 12/316,365

(22) Filed: Dec. 11, 2008

(65) Prior Publication Data

US 2010/0153496 A1  Jun. 17, 2010

(51) Int. Cl.
G06F 15/173 (2006.01)
H04L 29/06 (2006.01)
H04L 29/00 (2006.01)
H04L 29/08 (2006.01)

(52) U.S. Cl.
CPC ............ *H04L 65/1066* (2013.01); *H04L 29/00* (2013.01); *H04L 65/4015* (2013.01); *H04L 65/80* (2013.01); *H04L 67/101* (2013.01); *H04L 67/1002* (2013.01); *H04L 67/104* (2013.01); *H04L 67/1012* (2013.01); *H04L 67/14* (2013.01); *H04L 69/14* (2013.01)

(58) Field of Classification Search
USPC ......................................................... 709/224
See application file for complete search history.

(56) References Cited

U.S. PATENT DOCUMENTS

| | | | | |
|---|---|---|---|---|
| 6,512,745 B1* | 1/2003 | Abe et al. | | 370/232 |
| 6,658,003 B1* | 12/2003 | Sugai et al. | | 370/392 |
| 6,973,549 B1* | 12/2005 | Testardi | | 711/150 |
| 7,460,495 B2* | 12/2008 | Li | | 370/267 |
| 7,551,563 B2* | 6/2009 | Beadle et al. | | 370/238 |
| 7,590,756 B2* | 9/2009 | Chan | | 709/238 |
| 2002/0133491 A1* | 9/2002 | Sim et al. | | 707/10 |
| 2002/0150041 A1* | 10/2002 | Reinshmidt et al. | | 370/216 |
| 2003/0235187 A1* | 12/2003 | Iwama et al. | | 370/352 |
| 2005/0054346 A1* | 3/2005 | Windham et al. | | 455/445 |
| 2005/0203923 A1* | 9/2005 | Shand | | 707/100 |
| 2006/0187900 A1* | 8/2006 | Akbar | | 370/352 |
| 2006/0190615 A1* | 8/2006 | Panwar et al. | | 709/231 |
| 2006/0239207 A1* | 10/2006 | Naghian | | 370/254 |
| 2007/0147347 A1* | 6/2007 | Ristock | | 370/352 |
| 2007/0291771 A1* | 12/2007 | Cline | | 370/399 |
| 2008/0052394 A1* | 2/2008 | Bugenhagen et al. | | 709/224 |
| 2008/0059631 A1* | 3/2008 | Bergstrom et al. | | 709/224 |
| 2008/0080369 A1* | 4/2008 | Sumioka et al. | | 370/229 |

(Continued)

FOREIGN PATENT DOCUMENTS

WO  WO 2005/009019 A2  1/2005

*Primary Examiner* — Viet Vu
*Assistant Examiner* — James Edwards
(74) *Attorney, Agent, or Firm* — Jim Ross; Micky Minhas

(57) ABSTRACT

A method of transmitting data over a communication network from a first user terminal executing a communication client application to a second user terminal is provided. The communication client application of the first user terminal receives a command to transmit the data to the second user terminal and establishing a first connection between the first user terminal and the second user terminal via a first relay node. The transmission of the data from the first user terminal over the first connection is started, and at least one network parameter related to the transmission of the data is monitored and compared to at least one known value to determine whether to add a further connection. Responsive to determining that the further connection should be added, the further connection is established between the first user terminal and the second user terminal via a further relay node, and a first portion of the data transmitted via the first connection and a second portion of the data transmitted via the further connection.

28 Claims, 5 Drawing Sheets

(56) References Cited

U.S. PATENT DOCUMENTS

| | | |
|---|---|---|
| 2008/0285577 A1* | 11/2008 | Zisapel et al. ............... 370/409 |
| 2009/0094370 A1* | 4/2009 | Jacob et al. .................. 709/228 |
| 2009/0262668 A1* | 10/2009 | Hemar et al. ................ 370/260 |
| 2009/0303883 A1* | 12/2009 | Kucharczyk et al. ......... 370/241 |
| 2009/0316687 A1* | 12/2009 | Kruppa ........................ 370/352 |
| 2010/0064008 A1* | 3/2010 | Yan et al. ..................... 709/204 |
| 2010/0250737 A1* | 9/2010 | Bremler-Barr et al. ....... 709/224 |
| 2011/0158098 A1* | 6/2011 | Daraiseh et al. .............. 370/235 |

\* cited by examiner

METHOD AND SYSTEM FOR DATA TRANSMISSION

TECHNICAL FIELD

This invention relates to a method and system for data transmission.

BACKGROUND

Packet-based communication systems allow the user of a device, such as a personal computer, to communicate across a computer network such as the internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute communication client software on their user terminal. The communication client software provides the VoIP connections as well as other functions such as registration and authentication. In addition to voice communication, the packet-based communication systems can also provide further features such as video calling, file transfer, instant messaging ("IM"), and voicemail.

One type of packet-based communication system uses a peer-to-peer ("P2P") overlay topology operating on the internet. To enable access to a peer-to-peer system, the user must execute P2P client software provided by a P2P software provider on their user terminal, and register with the P2P system. When the user registers with the P2P system the client software is provided with a digital certificate from a server. Once the client software has been provided with the certificate, communication can subsequently be set-up and routed between user terminals of the P2P system without the further use of a server. The network address of a destination user terminal can be found by the client software accessing a P2P database distributed across other user terminals of the P2P system. Once the network address of the destination user terminal is known, the calling user terminal can exchange of one or more digital certificates with the destination user terminal. The exchange of the digital certificates between the user terminals provides proof of the users' identities and that they are suitably authorised and authenticated in the P2P system. Therefore, the presentation of digital certificates provides trust in the identity of the user. It is therefore a characteristic of peer-to-peer communication that the communication can be established and proceeds without using a server, by operating from end-user terminal to end-user terminal with support provided by other end-user terminals of the P2P system. Further details on such a P2P system are disclosed in WO 2005/009019.

A problem with packet-based communication systems is that firewalls and/or network address translation ("NAT") gateways are often present between one or both of a calling user terminal and a called user terminal. Firewalls and NAT gateways frequently block access to the packet-based communication system, such that connections between the calling user terminal and the called user terminal cannot be established. In particular, firewalls and NAT gateways often block incoming connections, which can prevent a direct connection being established between the calling and called user terminal. Direct connections between the calling and called user terminal are preferable, as they are the most reliable and have the lowest latency.

In order to alleviate the problems with strong firewalls or NAT gateways blocking direct connections between user terminals, the packet-based communication system can be arranged to utilise relay nodes in the connections. A relay node is chosen that does not have problems with firewalls or NAT gateways. In other words, a relay node that can openly access the packet-based communication system is selected. Because the relay node is unencumbered by strong firewalls or NAT gateways it is able to accept incoming connections. Each of the calling and called user terminals is controlled to connect to the relay (i.e. outgoing connections are established from both the calling and called user terminals to the relay to avoid their firewall problems). The relay can accept both of these incoming connections. Once these connections are established, the calling and called user terminal are able to communicate using the packet-based communication system, as the relay node passes the data packets between the two.

In a P2P system, the relay nodes can be other user terminals executing the communication client software that have favourable firewall/NAT gateway conditions. The relaying functionality is invisible to the users of these user terminals.

A problem with using a relay node is that it is not as reliable and has a higher latency and lower throughput compared to a direct connection between the calling and called user terminals. This is particularly the case where the relay node is another user terminal in the packet-based communication system. This is because the user of the user terminal that is acting as the relay node may choose to deactivate or disconnect their user terminal, thereby removing the relay node. This breaks the connection between the calling and called user terminals, and means that a new relay node must be found to replace it. In addition, the resources used at the relay node in relaying a connection (e.g. network bandwidth or CPU resources) must be limited, because otherwise the operation of the user terminal acting as a relay node would be significantly impaired.

The problems caused by relayed connections are particularly noticeable to the users when a large amount of data needs to be sent over the packet-based communication system, for example during a video call or a file transfer. There is therefore a need for a technique to address the aforementioned problems with relayed connections.

SUMMARY

According to one aspect of the invention there is provided a method of transmitting data over a communication network from a first user terminal executing a communication client application to a second user terminal, comprising: the communication client application of the first user terminal receiving a command to transmit the data to the second user terminal and establishing a first connection between the first user terminal and the second user terminal via a first relay node; starting the transmission of the data from the first user terminal over the first connection; monitoring at least one network parameter related to the transmission of the data and comparing the at least one network parameter to at least one known value to determine whether to add a further connection; responsive to determining that the further connection should be added, establishing the further connection between the first user terminal and the second user terminal via a further relay node; and transmitting a first portion of the data via the first connection and a second portion of the data via the further connection.

In one embodiment, the at least one network parameter comprises resource usage at the first relay node, and the at least one known value comprises a maximum resource usage at the first relay node. The step of comparing may comprise determining that the further connection should be added if the resource usage at the first relay node equals or exceeds the maximum resource usage at the first relay node. Preferably, the resource comprises at least one of: an uplink bandwidth of the first relay node; a downlink bandwidth of the first relay node; and a processor load on the first relay node.

In another embodiment, the at least one network parameter comprises an uplink bandwidth utilisation at the first user terminal, and the at least one known value comprises an uplink bandwidth capacity at the first user terminal. The step of comparing may comprise determining that the further connection should be added if the uplink bandwidth utilisation at the first user terminal is less than the uplink bandwidth capacity at the first user terminal.

In another embodiment, the at least one network parameter comprises a downlink bandwidth utilisation at the second user terminal, and the at least one known value comprises a downlink bandwidth capacity at the second user terminal. The step of comparing may comprise determining that the further connection should be added if the downlink bandwidth utilisation at the second user terminal is less than the downlink bandwidth capacity at the second user terminal.

In another embodiment, the at least one network parameter comprises the time elapsed since the transmission of the data started, and the at least one known value comprises a predetermined time interval.

The step of comparing may comprise determining that the further connection should be added if the time elapsed since the transmission of the data started equals or exceeds the predetermined time interval.

The method may further comprise the step of, subsequent to transmitting the first portion of the data via the first connection and the second portion of the data via the further connection, determining whether the throughput of the transmitted data has increased relative to the throughput before establishing the further connection.

In the case that the throughput of the transmitted data has increased, the method may repeat the steps of monitoring the at least one network parameter related to the transmission of the data and compare the at least one network parameter to the at least one known value to determine whether to add a yet further connection.

Preferably, the method further comprises the steps of, responsive to determining that a yet further connection should be added, establishing the yet further connection between the first user terminal and the second user terminal via a yet further relay node; and transmitting a first portion of the data via the first connection, a second portion of the data via the further connection, and a third portion of the data via the yet further connection.

Preferably, the first and second relay nodes are further user terminals, each executing the communication client application.

In embodiments, the first relay node is selected for use in the first connection responsive to determining that a network entity is restricting communication between at least one of the first and second user terminals and the communication network. The network entity may be a firewall or a network address translation gateway.

The communication client application of the first user terminal may receive the command to transmit the data to the second user terminal from a user of the first user terminal or from a further application executed on the first user terminal.

Preferably, the step of transmitting a first portion of the data via the first connection and a second portion of the data via the further connection comprises alternately transmitting packets of the data via the first and second connection.

Preferably, at least a part of the first and second portions of the data contain common data.

The communication network may be a peer-to-peer system operating on the internet.

According to another aspect of the invention there is provided a computer program product comprising program code means which, when executed by a computer implement the steps according to the above method.

According to another aspect of the invention there is provided a user terminal connected to a communication network, comprising: a processor arranged to execute a communication client application, wherein the communication client application is configured to: receive a command to transmit data to a second user terminal; establish a first connection between the first user terminal and the second user terminal via a first relay node; start the transmission of the data from the first user terminal over the first connection; monitor at least one network parameter related to the transmission of the data; compare the at least one network parameter to at least one known value to determine whether to add a further connection; establish the further connection between the first user terminal and the second user terminal via a further relay node responsive to determining that the further connection should be added; and transmit a first portion of the data via the first connection and a second portion of the data via the further connection.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
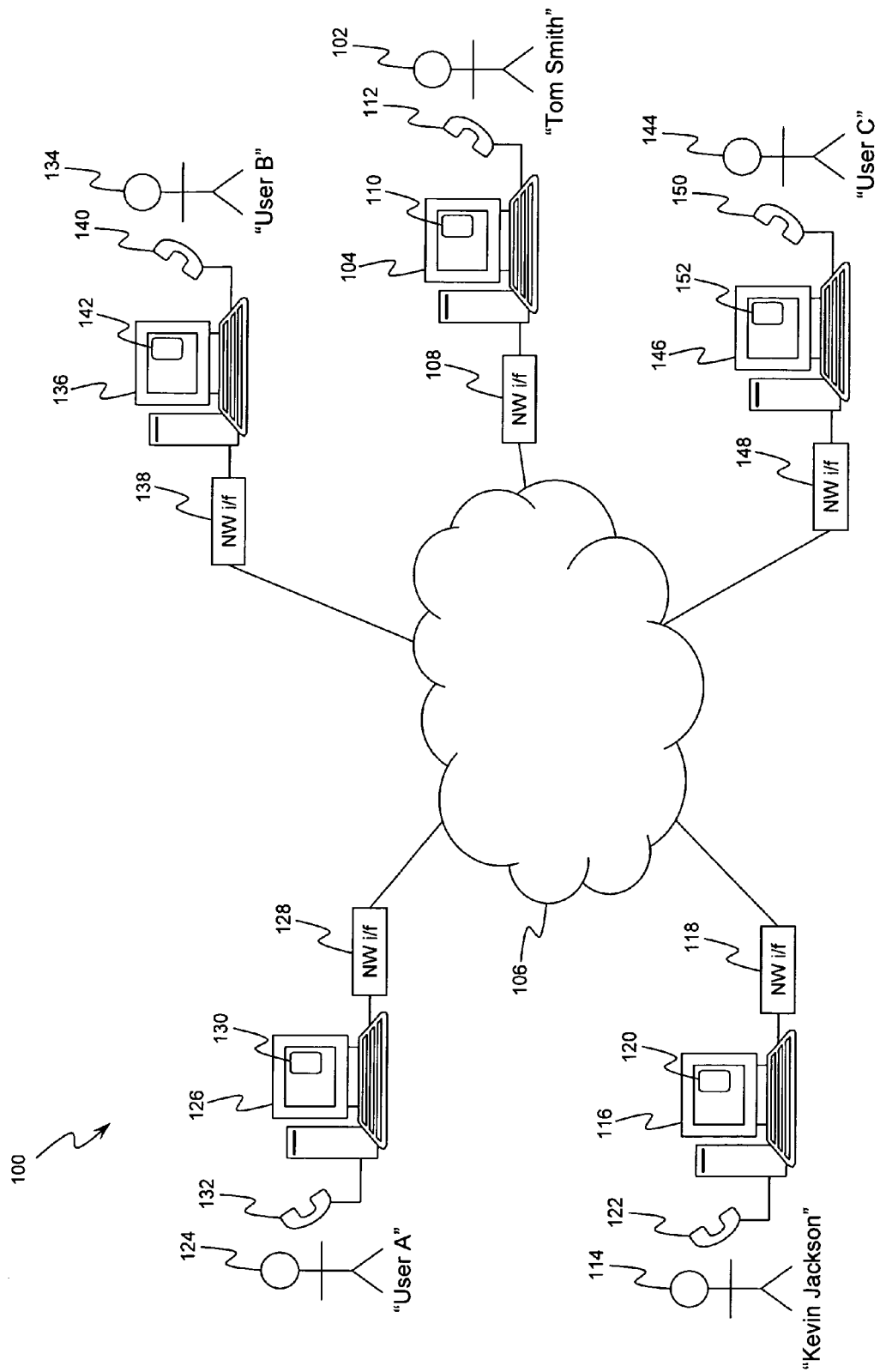
FIG. 1 shows a packet-based communication system.

Reference is first made to FIG. 1, which illustrates a packet-based communication system 100. Note that whilst this illustrative embodiment is described with reference to a P2P overlay system, other types of communication system could also be used, such as non-P2P, VoIP, IM or file transfer systems. A first user of the communication system (named "Tom Smith" 102) operates a user terminal 104 which is able to connect to a network 106 such as the Internet. The user terminal 104 may be, for example, a personal computer ("PC") (including, for example, Windows™, Mac OS™ and Linux™ PCs), a personal digital assistant ("PDA"), a mobile phone, a gaming device or other embedded device able to connect to the network 106. The user terminal 104 is arranged to receive information from and output information to the user 102 of the device. In a preferred embodiment of the invention the user device comprises a display such as a screen and an input device such as a keyboard, mouse, joystick and/or touch-screen. The user device 104 is connected to the network 106 via a network interface 108 such as a modem, and the connection between the user terminal 104 and the network interface 108 can be via a cable (wired) connection or a wireless connection. Note that in alternative embodiments, the user terminal 104 can connect to the communication network 106 via additional intermediate networks not shown in FIG. 1.

The user terminal 104 is running a communication client 110, provided by the packed-based communication system software provider. The communication client 110 is an application layer software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 104, or integrated into the user terminal 104 itself.

Figure 2:
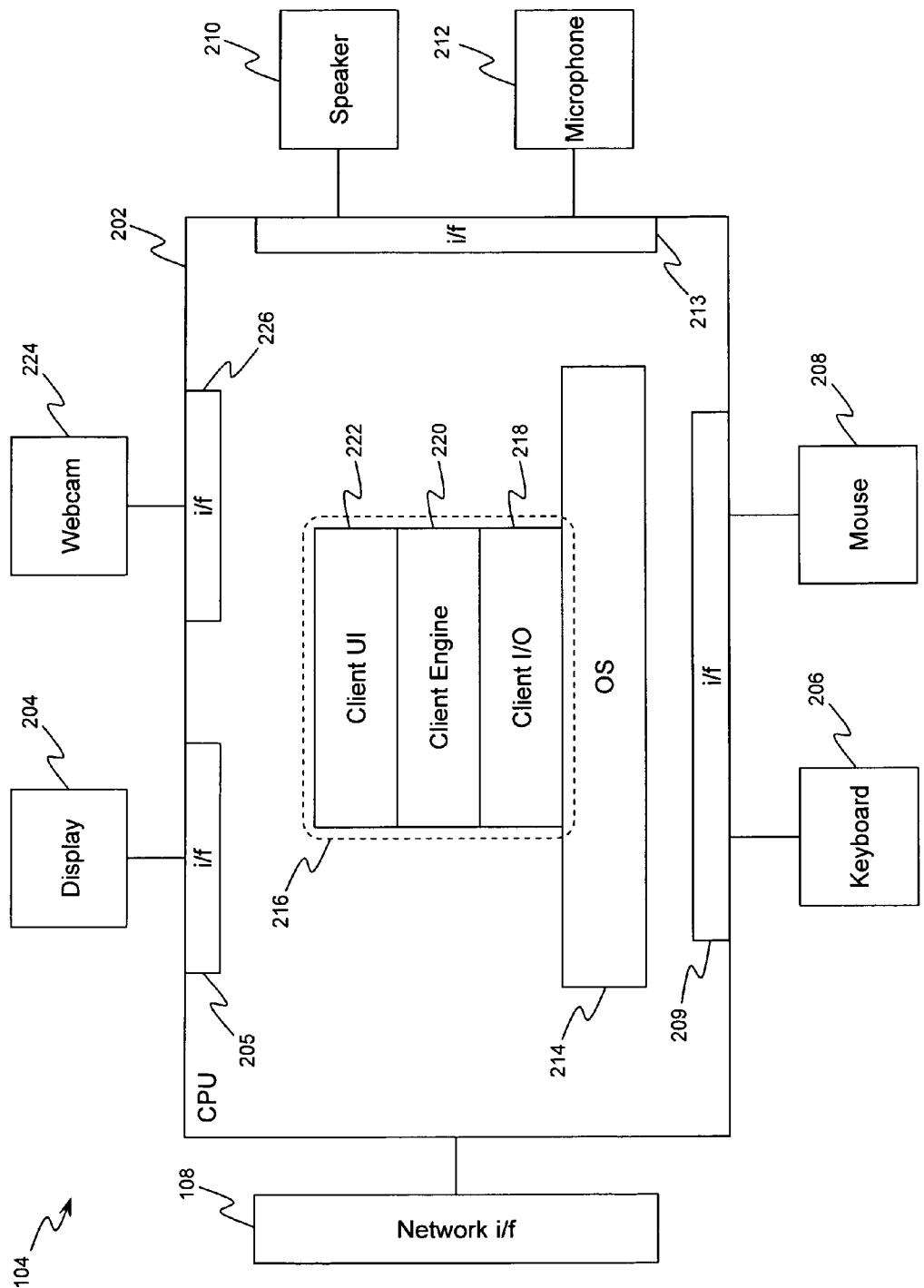
FIG. 2 shows the structure of a user terminal in the packet-based communication system.

FIG. 2 illustrates a detailed view of the user terminal 104 on which is executed client 110. The user terminal 104 comprises a central processing unit ("CPU") 202, to which is connected a display 204 such as a screen via a display interface 205, an input device such as a keyboard 206 and a pointing device such as a mouse 208 connected via an interface 209 such as USB. In alternative terminals, the input devices and pointing device can be integrated into the terminal, such as a keypad, touch-screen and/or joystick. An output audio device 210 (e.g. a speaker) and an input audio device 212 (e.g. a microphone) are connected via an audio interface 213. The output audio device 210 and input audio device 212 may be integrated into a handset 112 or headset, or may be separate. The CPU 202 is connected to the network interface 108. The CPU 202 is also optionally connected to a webcam 224 via interface 226, for use in video calls.

FIG. 2 also illustrates an operating system ("OS") 214 executed on the CPU 202. Running on top of the OS 214 is a software stack 216 for the client 110. The software stack shows a client I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 108. With reference to the TCP/IP model, the operating system implements the transport, internet, and (optionally) a portion of the link layer, with the remainder of the link layer being implemented in firmware at the user terminal 104. The communication client 110 operates at the application layer. The client I/O layer 218 of the client software communicates with the operating system 214 and handles voice and video coding and manages the signalling and data connections over the communication system. Higher level functionality is provided by the client engine layer 220, including, for example, handling presence, relaying, user address look-up and authentication. The client engine 220 also communicates with the client user interface layer 222. The client engine 220 may be arranged to control the client user interface layer 222 to present information to the user via the user interface of the client (as shown in FIG. 2) and to receive information from the user via the user interface.

Figure 3:
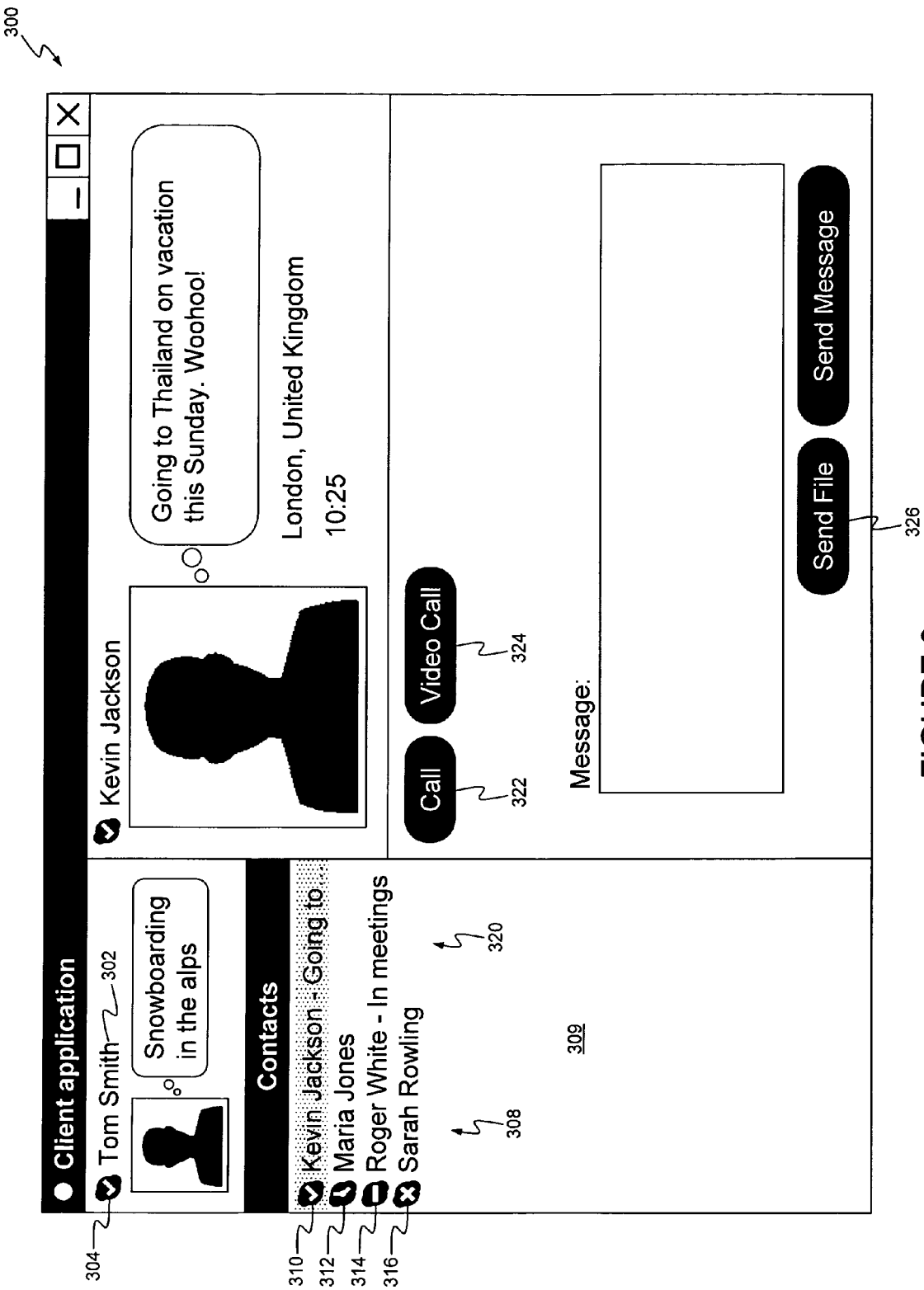
FIG. 3 shows a user interface of a communication client in the packet-based communication system.

An example of a user interface 300 of the communication client 110 executed on the user terminal 104 of the first user 102 is shown illustrated in FIG. 3. Note that the user interface 300 can be different depending on the type of user terminal 104. For example, the user interface can be smaller or display information differently on a mobile device, due to the small screen size. In the example of FIG. 3, the client user interface 300 displays the username 302 of "Tom Smith" 102 in the communication system, and the user can set his own presence state (that will be seen by other users) using a drop down list by selecting icon 304.

The client user interface 300 comprises a contact list 308 displayed in a pane 309. In the example user interface in FIG. 3, four contacts of other users of the communication system are shown listed in contact list 308. Each contact in the contact list has a presence state chosen by the contact associated with it, and each of these contacts have authorised the user of the client to view their contact details and the contact-defined presence information. For example, the presence status icon for "Kevin Jackson" 310 indicates that this contact is "online", the presence icon for "Maria Jones" 312 indicates that this contact is "away", the presence icon for "Roger White" 314 indicates that this contact's state is "do not disturb" ("DND"), the presence icon for "Sarah Rowling" 316 indicates that this contact is "offline". Further presence state indications can also be included. Mood messages 320 of the contacts are shown displayed next to the names of the contacts in pane 309.

VoIP calls to the users in the contact list may be initiated over the communication system by selecting the contact and clicking on a "call" button 322 using a pointing device such as a mouse. Similarly, a video call can be initiated by selecting the contact and clicking on a "video call" button 324. In addition to making real-time calls (voice or video), the user of the client 110 can also communicate with the users listed in the contact list 308 in several other ways. For example, the user 102 can use the client 110 to transmit documents or files to users in the contact list 308, by selecting a contact and clicking on the "send file" button 326.

The process for establishing a connection between user terminals is similar for each of the above-mentioned types of communication (i.e. calls, messages or file transfer). The connection set-up is performed using proprietary protocols, and is established over the network 106 between the calling user and called user by the peer-to-peer overlay system without the use of central servers.

As stated previously, it is preferable for direct connections to be established between the calling and called user terminals. However, this is not always possible if one or more of the parties have restrictive firewalls or NAT gateways.

Described below is an illustrative example of the communication process where there are not restrictive firewalls or NAT gateways present. In this illustrative example, the calling user "Tom Smith" 102 establishes a voice call with second user "Kevin Jackson" 114. The process is similar for video calls and file transfer.

After looking-up the network address of the called user terminal in a distributed P2P database, and following authentication through the presentation of digital certificates (to prove that the users are genuine subscribers of the communication system—described in more detail in WO 2005/009019), the call can be made using VoIP. The client 110 performs the encoding and packetisation voice data into VoIP packets. VoIP packets from the user terminal 104 are transmitted into the network 106, and routed to a user terminal 116 of the called party 114, via a network interface 118. A client 120 (similar to the client 110) running on the user terminal 116 of the called user 114 decodes the VoIP packets to produce an audio signal that can be heard by the called user using the handset 122. Conversely, when the second user 114 talks into handset 122, the client 120 executed on user terminal 116 encodes the audio signals into VoIP packets and transmits them across the network 106 to the user terminal 104. The client 110 executed on user terminal 104 decodes the VoIP packets, and produces an audio signal that can be heard by the user of the handset 112.

Due to the P2P nature of the system illustrated in FIG. 1, the actual voice calls between users of the communication system can be made with no central servers being used. This has the advantages that the network scales easily and maintains a high voice quality, and the call can be made free to the users.

If, however, one or both of the calling user 102 and the called user 114 are behind restrictive firewalls or NAT gateways (not shown in FIG. 1), then the connection needs to be made via a relay node. In the example P2P system used here, the relay node is the terminal of another user of the packet-based communication system. Any user terminal that has favourable firewall or NAT gateway conditions can be elected to become a relay node (assuming sufficient resources are present).

For example, referring again to FIG. 1, a further user called "User A" 124 operates a user terminal 126 and is connected to the network 106 via a network interface 128. The user terminal 126 executes a communication client application 130 and is connected to a handset 132. Yet further users of the packet-based communication system can also be connected, as illustrated by "User B" 134 (operating user terminal 136 connected to network interface 138 and handset 140, and executing communication client 142) and "User C" 144 (operating user terminal 146 connected to network interface 148 and handset 150, and executing communication client 152). If any one of these further user terminals (126, 136, 146) do not have restrictive firewalls or NAT gateways, then they can be chosen to act as a relay node.

If, for example, the calling user terminal 104 and the called user terminal 116 have restrictive firewalls between them and the network 106, then a direct connection cannot be established and a relay is required. The selection of relays is performed by an administrative node in the packet-based communication network (also called a "supernode"). The administrative node functionality is preferably implemented on another user terminal of the packet-based communication system (and hence not a central server). In this example the user terminal 126 of User A 124 is chosen to act as the relay node. The client 110 of user terminal 104 initiates a connection to the relay user terminal 126, and the client 120 of the user terminal 116 is instructed (by the administrative node) to also initiate a connection to the relay user terminal 126. These are both outgoing connections from the user terminal 104 and 116, and hence not blocked by the firewalls.

Data (be it voice call data, video call data or file transfer data) can then be passed between the user "Tom Smith" 102 and "Kevin Jackson" 114 by using the connections to the relay user terminal 126. The relay 126 passes the data between the two user terminals without reading the content (it is also preferably encrypted to prevent eavesdropping).

As stated, whilst relay nodes solve the problem with firewalls and NAT gateways, they also introduce additional problems. A relayed connection is not as reliable and has a higher latency and lower throughput compared to a direct connection between user terminals. In the case that the relay node is another user terminal, such as User A's user terminal 126 described above, then User A 124 can deactivate or disconnect the user terminal 126, thereby removing the relay node. This breaks the connection between the calling and called user terminals, and means that a new relay node must be found to replace it. Furthermore, in order to prevent User A's ability to use the user terminal 126 from being impaired by the relaying functionality, the resources used at the user terminal 126 in relaying the connection (e.g. network bandwidth or CPU resources) must be limited.

Figure 4:
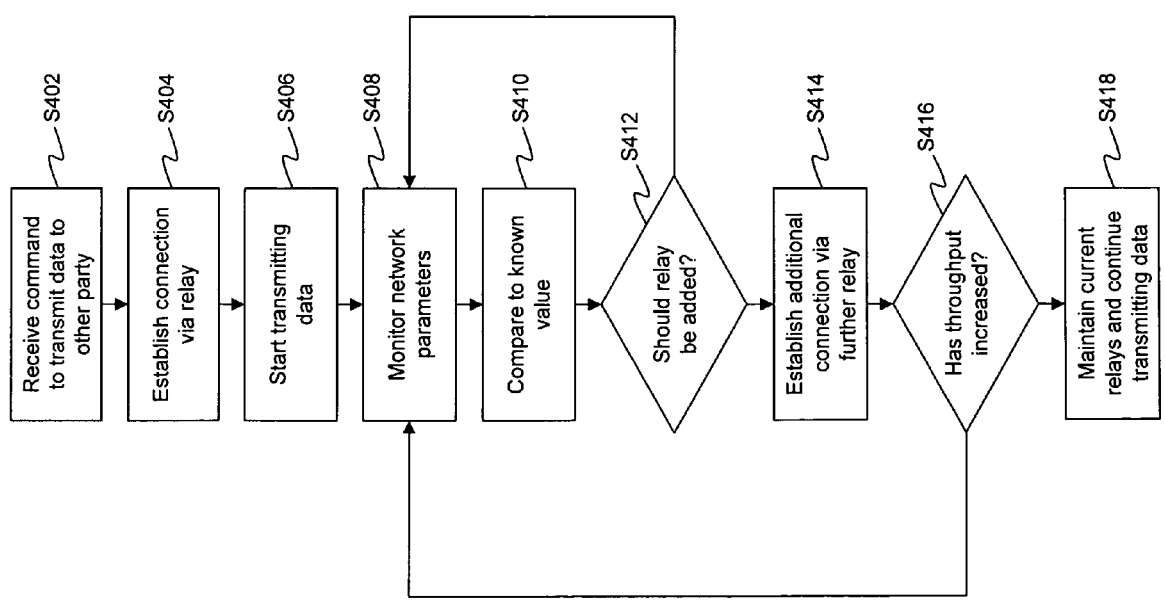
FIG. 4 shows a flowchart of a process for adding relay nodes.
Figure 5:
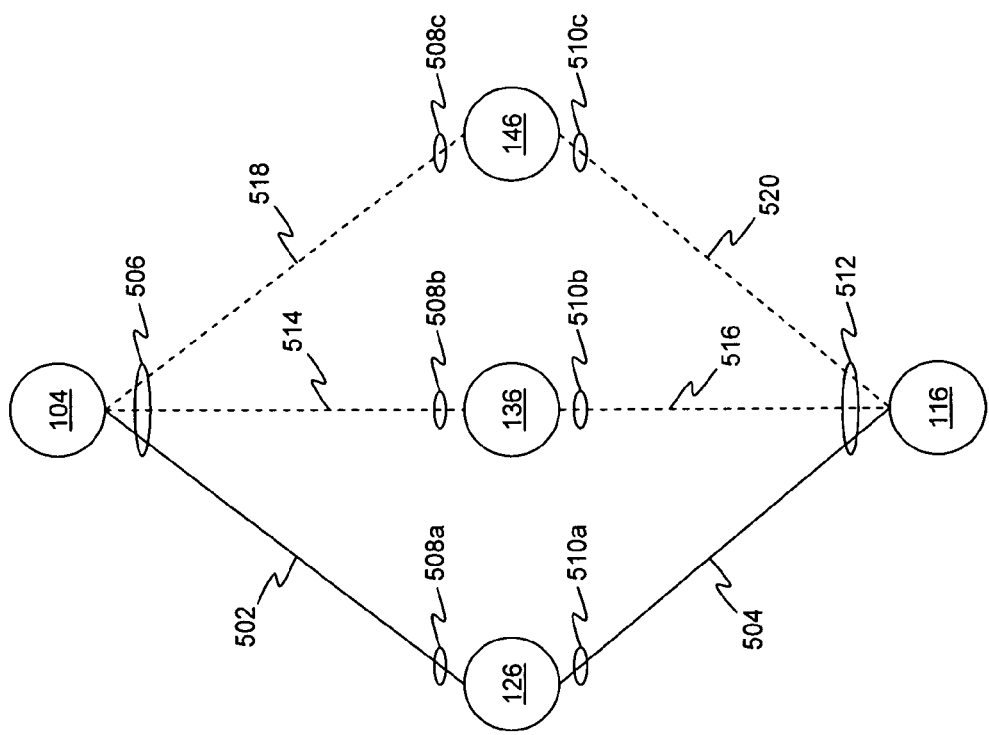
FIG. 5 shows relayed connections between two user terminals.

Reference is now made to FIG. 4, which illustrates a flowchart of a process to alleviate the problems with relayed connections. Reference is also made to FIG. 5, which schematically illustrates the relaying connections between user terminals 104 and 116 (as in FIG. 1).

In step S402 of FIG. 4, the communication client 110 of user terminal 104 receives a command to establish a connection and transmit data to user terminal 116. This data can be in the form of, for example, voice call data, video call data, or a file transfer. If the user terminal 104 is establishing a voice or video call with user terminal 116, then the user terminal 104 is the "calling user terminal" and user terminal 116 is the "called user terminal". If the user terminal 104 is sending a file to user terminal 116, then user terminal 104 is the "sending user terminal", and user terminal 116 is the "receiving user terminal". For the purposes of this description, the terms "calling user terminal" and "sending user terminal" are considered to equivalent. Similarly, the terms "called user terminal" and the "receiving user terminal" are also considered equivalent.

The command to establish a connection and transmit data to user terminal 116 can originate from a number of sources. This can originate from the user 102 selecting to initiate communication using the communication client 110 user interface (as shown in FIG. 3), for example by selecting one of the call or file transfer buttons (322, 324, 326). The command can also originate from the user 102 operating a hardware device connected to the user terminal 104, for example on the handset 112. Alternatively, the command can originate from another module within the communication client software 110, or from another application executed on the operating system 214 of the user terminal 104. Furthermore, the command can originate from outside the user terminal 104, and be communicated to the user terminal 104 via the network 106.

In step S404, a connection is established between user terminal 104 and user terminal 116 via a relay node (user terminal 126 in this example) in the manner described hereinbefore. It is assumed here that the firewall/NAT gateway situation for either or both of the user terminals 104 and 116 is such that a relay is required because a direct connection is not possible. The connection situation is illustrated in FIG. 5, where user terminal 104 is shown connected to the relay node 126 via connection 502, and the relay node 126 is connected to the user terminal 116 via connection 504. In step S406, user terminal 104 begins sending the data to the user terminal 116 via the relay 126.

Once the data is being sent, the communication client 110, in step S408, monitors parameters of the network that are relevant to the relayed connection. One or more parameters can be monitored. In particular, the monitored parameters can include at least a bandwidth of a connection, a CPU resource, or a time period.

Some example bandwidth-related parameters that can be monitored are illustrated in FIG. 5. The bandwidth used by the transmitted data can be monitored at several locations, such as: at the uplink 506 of the user terminal 104; at the downlink 508a of the relay node 126; at the uplink 510a of the relay node 126; and the downlink 512 of the user terminal 116.

Furthermore, CPU resources can be monitored, such as the CPU load caused by relaying the data at the relay node 126. Additionally, time periods can be monitored, such as the time that has elapsed since data has been transmitted via a particular relay.

In step S410, the monitored parameter value or values are compared to predetermined, known parameter values. The particular known parameter value used depends on the network parameter that was monitored, as described below. In step S412, this comparison is used to decide whether the connection between the user terminals can be improved (e.g. in terms of throughput or latency) through the addition of a further relay node.

The various parameters that can be monitored, and how these are used to decide whether to add another relay to the connection are summarised in the table below, and described in more detail hereinafter.

|      | Monitored Location | Monitored Parameter | Comparison Value | When To Add Relay |
|------|---|---|---|---|
| i)   | Sender uplink (506) | Used bandwidth | Bandwidth capacity | If used bandwidth < capacity |
| ii)  | Relay downlink (508) | Used bandwidth | Maximum allowable bandwidth utilisation | If used bandwidth ≥ maximum utilisation |
| iii) | Relay uplink (510) | Used bandwidth | Maximum allowable bandwidth utilisation | If used bandwidth ≥ maximum utilisation |
| iv)  | Receiver downlink (512) | Used bandwidth | Bandwidth capacity | If used bandwidth < capacity |
| v)   | Relay CPU | CPU load | Maximum allowable CPU load | If used CPU load ≥ maximum load |
| vi)  | Sender (104) | Time elapsed since last relay added | Fixed time interval | If time elapsed ≥ time interval |

Referring to row i) of the above table, if the bandwidth used by the data transmission at the uplink 506 at user terminal 104 is monitored, then this is compared to the overall available uplink bandwidth capacity. This comparison indicates whether there is spare uplink bandwidth capacity at the user terminal 104. Spare capacity at the uplink 506 indicates that the connection speeds (i.e. throughout) could potentially be increased, as other parts of the connection are proving to be the connection bottleneck, and not the uplink 506. Therefore, if the monitored utilised uplink bandwidth is less than the uplink capacity, then, in S412, it is decided that another relay can be added. Note that this decision can also be made in combination with other monitored parameters, and not necessarily on the basis of this parameter alone.

Referring now to row ii) of the table, if the bandwidth used by the data transmission at the downlink 508a of the relay node 126 is monitored, then this is compared to a maximum allowable proportion of the relay node's downlink bandwidth that can be utilised for relayed traffic. This therefore indicates whether the relay node 126 is currently operating at full capacity in terms of its downlink bandwidth. The relay node 126 can be limited such that only a fixed proportion of its available bandwidth can be used for relayed data traffic. This prevents the relaying operation from adversely affecting the operation of the relaying user terminal when it is used by the user for other tasks. If the relay node 126 is operating at full capacity in terms of its downlink bandwidth, then this indicates that the throughput through this relay cannot be increased any further. Therefore, if it is determined that the throughput through this relay cannot be increased any further, then in step S412 it is decided that another relay should be added. Note that this decision can also be made in combination with other monitored parameters, and not necessarily on the basis of this parameter alone, as outlined below.

With reference to row iii) of the table, if the bandwidth used by the data transmission at the uplink 510a of the relay node 126 is monitored, then this is compared to a maximum allowable proportion of the relay node's uplink bandwidth that can be utilised for relayed traffic. This therefore indicates whether the relay node 126 is currently operating at full capacity in terms of its uplink bandwidth. If so, then this indicates that the throughput through this relay cannot be increased any further. If it is determined that the throughput through this relay cannot be increased any further, then in step S412 it is decided that another relay should be added. Note that this decision can also be made in combination with other monitored parameters, and not necessarily on the basis of this parameter alone, as discussed below.

Referring to row iv) of the table, if the bandwidth used by the data transmission at the downlink 512 at user terminal 116 is monitored, then this is compared to the overall available downlink bandwidth capacity. This indicates whether there is spare downlink bandwidth capacity at the user terminal 116. Spare capacity at the downlink 512 indicates that the connection speeds (i.e. throughout) could potentially be increased, as other parts of the connection are slowing the connection. Therefore, if the monitored utilised downlink bandwidth is less than the uplink capacity, then, in S412, it is decided that another relay can be added. Note that this decision can also be made in combination with other monitored parameters, and not necessarily on the basis of this parameter alone.

With reference to row v) of the above table, if the CPU load at the relay node 126 is monitored, then this is compared to a maximum CPU load that is permissible at the relay node. The relaying operation can be limited to only be able to consume a particular proportion of the CPU resources at the relay node, in order to prevent the relaying impacting other uses of the relaying user terminal 126. This therefore indicates whether the relay node 126 is currently operating at full capacity in terms of its CPU load. If the relay node 126 is operating at full capacity in terms of its CPU load, then this indicates that the throughput through this relay cannot be increased any further. If this is the case, then in step S412 it is decided that another relay should be added. Note that this decision can also be made in combination with other monitored parameters, and not necessarily on the basis of this parameter alone, as described below.

Lastly, referring to row vi) of the table, the time period that has elapsed since a connection was established via a particular relay node can be monitored. This therefore monitors how long it has been since a particular relay was used to transmit data between the calling and called user terminals. This can be compared to a fixed, predetermined time interval. The fixed time interval sets a time period after which the addition of a new relay should be attempted. The comparison therefore determines whether a connection via a given relay has been established for more than or equal to the maximum time interval. If this is the case, then in step S412 it is decided that another relay should be added. Note that this decision can also be made in combination with other monitored parameters, and not necessarily on the basis of this parameter alone, as described below.

Several of these parameters can be monitored and analysed together to determine whether to add another relay node. For example, each of the relay downlink (508), relay uplink (510) and relay CPU can be monitored and compared to the maximum values, and if one or more of them indicates that the relay is running at full capacity, then S412 decides that a further relay should be added.

The monitoring of the elapsed time can also be combined with any other monitored parameters to ensure that a certain time elapses between each addition of a relay node. This ensures that relays are not added too frequently.

If in step S412 it is decided that an additional relay should not be added, then control returns to step S408, and the network parameters continue to be monitored whilst the transmitted data continues to be sent from the calling user terminal 104 to the called user terminal 116 via relay node 126.

If, however, the decision in step S412 is to add an additional relay, then in step S414 an additional connection is established with a new relay node. For example, referring to FIG. 5, relay node 136 is selected to be added as the new rely node, and a connection 514 is established between the calling user terminal 104 and the relay node 136 and between the relay node 136 and the called user terminal 116 (in the same way as was done with the first relay 126 for connections 502 and 504). Note that this new relay node 136 is added in addition to the existing relay node 126, and does not replace it.

Once the connections have been set up with the new relay node 136, then the transmitted data can be shared between the pre-existing relay node 126 and the newly added relay node 136. The sharing of the transmitted data over the two relays (126, 136) can be done in a number of different ways. Preferably, the data is interleaved between the two relays, such that alternate packets are sent via each relay. This then operates such that a first packet of data is sent via the first relay, a second packet of data is sent via the second relay, a third packet of data is sent via the first relay, a fourth packet of data is sent via the second relay, and so on. In alternative embodiments, the division of the data between the relays can be based not on packets, but on other factors such as speech or video frames from a codec (i.e. alternate frames are sent via each relay). An alternative method of sharing the data, which can be used for file transfers, is to divide the overall file into two contiguous portions, and send each portion via one relay.

Furthermore, the sharing of data between the two relays can be arranged to increase the reliability of the data transmitted. For example, the some or all of the same data can be sent through both relays to provide diversity and redundancy. Alternatively, error correction or enhancement data can be sent via one of the relays, in order to correct or enhance the quality of the data sent via the other relay. This can be particularly advantageous in the case that either the calling or called end user are subject to lossy connection conditions.

The sharing of data can also be based on the relative capabilities or resources of the relay nodes. For example if the first relay node 126 has lower resources than the second relay node 136, then a corresponding proportion of the data can be sent via each of the respective relays.

In step S416, following the addition of the new relay node 136 and the subsequent transmission of a meaningful quantity of data, the throughput of the transmitted data is measured by the communication client 110.

If the throughput has not increased, then this indicates that the addition of the relay was not beneficial to the transmission of the data, and that the addition of yet further relays will not increase the throughput further (as another part of the connection is causing a bottleneck in the data transfer, not the relaying). Hence, if the throughput has not increased, then in step S418 the current relays and connections are maintained, and the transmission of data is continued in this state until the transmission is complete.

On the other hand, if the throughput has increased, then this indicates that the addition of the relay was beneficial to the transmission of the data. If this is the case, then control returns to S408 and the monitoring of parameters continues. The process can then repeat, such that it can be determined from the parameters that the addition of a third relay could be beneficial. For example, referring to FIG. 5, the monitored parameters can indicate that another relay should be added, and relay node 146 is selected. This is added by establishing connection 518 between the calling user terminal 104 and the relay node 146, and connection 520 between the relay node 146 and the called user terminal 116. The data is then divided or interleaved between the three relay nodes (126, 136, 146) shown in FIG. 5.

Yet further relay nodes can also be added (in addition to those shown in FIG. 5) if the process in FIG. 4 determines (through further iterations) that this is beneficial to the transmission of the data.

The above-described technique therefore determines whether it is appropriate for additional relays to be added to a relayed connection between two user terminals. The addition of relays in appropriate circumstances increases the throughput and reliability of the connection.

While this invention has been particularly shown and described with reference to preferred embodiments, it will be understood to those skilled in the art that various changes in form and detail may be made without departing from the scope of the invention as defined by the appendant claims.

For example, in alternative embodiments, it can be the called/receiving user terminal that monitors the parameters and decides that another relay should be added. Alternatively, it can be the relay itself that monitors the parameters and signals to either the calling or called user terminal that it would be appropriate to add another relay.

In further embodiments, steps S416 and S418 in FIG. 4 can be optional. In other words, the process does not check in S416 that the throughput has increased, and stop adding relays if it has not. Instead, the addition of relays can solely be controlled by the monitoring of parameters in S408-S412. However, in the case that the only monitored parameter is the time elapsed since the connection with the last relay was established, then steps S416 and S418 should be included. This provides a simple embodiment for implementing the technique, such that a connection with a relay is established and is maintained for a predetermined period of time. After this predetermined time has elapsed, a further relay is added and it is determined whether the throughput increases. If the throughput does increase, then the timer is restarted and another relay will be added at its expiry and the process repeats. If the throughput does not increase, then the process of adding further relays is ceased.

In yet further embodiments, step S418 can be arranged such that, in response to determining that the addition of a new relay has not increased the throughput, the newly added relay node is removed from the connection between the calling and called user terminals.

What is claimed is:

1. A method of transmitting data over a communication network, comprising:
   receiving a command to transmit the data from a first user terminal to a second user terminal, and establishing a first connection between the first user terminal and the second user terminal via a first relay node;
   starting transmission of the data from the first user terminal over the first connection;
   while transmitting at least a portion of the data over the first connection:
      monitoring at least one network parameter related to the transmission of the data over the first connection;
      comparing the at least one network parameter to at least one known value; and
      determining whether to add a further connection between the first user terminal and the second user terminal via a further relay node, in addition to the first connection, based on said comparing;
   responsive to determining that the further connection is to be added and while maintaining the first connection, establishing the further connection between the first user terminal and the second user terminal via the further relay node; and
   distributing transmission of the data between the first connection and the further connection including alternating back and forth between:
      transmitting some portions of the data from the first user terminal to the second user terminal via the first connection; and
      transmitting other, different portions of the data from the first user terminal to the second user terminal via the further connection, the data originating from the first user terminal and including at least one of voice communication data or video communication data.

2. A method as claimed in claim 1, wherein the at least one network parameter comprises resource usage at the first relay node, and the at least one known value comprises a maximum resource usage at the first relay node, and wherein the step of comparing comprises determining that the further connection is to be added if the resource usage at the first relay node equals or exceeds the maximum resource usage at the first relay node.

3. A method as claimed in claim 2, wherein a resource associated with the resource usage comprises at least one of: an uplink bandwidth of the first relay node; a downlink bandwidth of the first relay node; or a processor load on the first relay node.

4. A method as claimed in claim 1, wherein the at least one network parameter comprises an uplink bandwidth utilisation at the first user terminal, and the at least one known value comprises an uplink bandwidth capacity at the first user terminal, and wherein the step of comparing comprises determining that the further connection is to be added if the uplink bandwidth utilisation at the first user terminal is less than the uplink bandwidth capacity at the first user terminal.

5. A method as claimed in claim 1, wherein the at least one network parameter comprises a downlink bandwidth utilisation at the second user terminal, and the at least one known value comprises a downlink bandwidth capacity at the second user terminal, and wherein the step of comparing comprises determining that the further connection is to be added if the downlink bandwidth utilisation at the second user terminal is less than the downlink bandwidth capacity at the second user terminal.

6. A method as claimed in claim 1, wherein the at least one network parameter comprises a time elapsed since the transmission of the data started, and the at least one known value comprises a predetermined time interval, and wherein the step of comparing comprises determining that the further connection is to be added if the time elapsed since the transmission of the data started equals or exceeds the predetermined time interval.

7. A method according to claim 1, further comprising the step of determining whether throughput of transmitted data has increased relative to throughput of transmitted data before establishing the further connection.

8. A method according to claim 7, wherein, in the case that the throughput of the transmitted data has increased, repeating the steps of monitoring the at least one network parameter related to the transmission of the data and comparing the at least one network parameter to the at least one known value to determine whether to add a yet further connection.

9. A method according to claim 8, further comprising the steps of, responsive to determining that a yet further connection should be added, establishing the yet further connection between the first user terminal and the second user terminal via a yet further relay node; and transmitting a first portion of the data via the first connection, a second portion of the data via the further connection, and a third portion of the data via the yet further connection.

10. A method according to claim 1, wherein the first and second relay nodes are further user terminals, each executing a communication client application configured to perform said receiving.

11. A method according to claim 1, wherein the first relay node is selected for use in the first connection responsive to determining that a network entity is restricting communication between at least one of the first and second user terminals and the communication network.

12. A method according to claim 11, wherein the network entity is a firewall or a network address translation gateway.

13. A method according claim 1, wherein a communication client application of the first user terminal receives the command to transmit the data to the second user terminal from at least one of a user of the first user terminal or a further application executing on the first user terminal.

14. A method according to claim 1, wherein said distributing transmission of the data further comprises alternating back and forth between transmitting the some portions of the data from the first user terminal to the second user terminal via the first connection, and transmitting the other, different portions of the data from the first user terminal to the second user terminal via the further connection.

15. A method according to claim 1, wherein at least a part of the portions of the data contain common data.

16. A method according to claim 1, wherein the communication network is a peer-to-peer system operating on the internet.

17. A computer program product comprising program code embodied on a computer readable device, the program code being executable by one or more processors to cause data to be transmitted over a communication client application for receipt by a second user terminal via acts comprising:
   receiving, at the communication client application of the first user terminal, a command to transmit the data to the second user terminal;
   establishing a first connection between the first user terminal and the second user terminal via a first relay node;

starting transmission of the data from the first user terminal over the first connection;
while transmitting data over the first connection:
monitoring at least one network parameter related to the transmission of the data over the first connection;
comparing the at least one network parameter to at least one known value; and
determining whether to add a further connection between the first user terminal and the second user terminal via a further relay node, in addition to the first connection, based on said comparing;
responsive to determining that the further connection is to be added, while maintaining the first connection and transmitting data over the first connection, establishing the further connection between the first user terminal and the second user terminal via a further relay node; and
distributing transmission of the data including alternating back and forth between transmitting portions of the data from the first user terminal to the second user terminal via the first connection and transmitting other, different portions of the data from the first user terminal to the second user terminal via the further connection, the first portion of the data and the second portion of the data being one of voice communication data, video communication data, or a combination of voice and video communication data.

18. A user terminal configured to be connected to a communication network, the user terminal comprising:
a processor configured to execute a communication client application to cause the user terminal to perform operations including:
receiving a command to transmit data for receipt by a second user terminal;
establishing a first connection between the first user terminal and the second user terminal via a first relay node;
starting transmission of the data from the first user terminal over the first connection;
while transmitting data over the first connection:
monitoring at least one network parameter related to the transmission of the data;
comparing the at least one network parameter to at least one known value to determine whether to add a further connection;
establishing the further connection between the first user terminal and the second user terminal via a further relay node responsive to determining that the further connection is to be added; and
distributing transmission of the data including alternating back and forth between:
transmitting portions of the data from the first user terminal to the second user terminal via the first connection; and
transmitting other, different portions of the data from the first user terminal to the second user terminal via the further connection, the first portion of the data and the second portion of the data being one of voice communication data, video communication data, or a combination of voice and video communication data.

19. A user terminal as claimed in claim 18, wherein the at least one network parameter comprises resource usage at the first relay node, and the at least one known value comprises a maximum resource usage at the first relay node, and wherein the communication client application is configured to determine whether to add a further connection if the resource usage at the first relay node equals or exceeds the maximum resource usage at the first relay node.

20. A user terminal as claimed in claim 19, wherein the resource usage is associated with at least one of: an uplink bandwidth of the first relay node; a downlink bandwidth of the first relay node; or a processor load on the first relay node.

21. A user terminal as claimed in claim 18, wherein the at least one network parameter comprises an uplink bandwidth utilisation at the first user terminal, and the at least one known value comprises an uplink bandwidth capacity at the first user terminal, and wherein the communication client application is configured to determine to add a further connection if the uplink bandwidth utilisation at the first user terminal is less than the uplink bandwidth capacity at the first user terminal.

22. A user terminal as claimed in claim 18, wherein the at least one network parameter comprises a downlink bandwidth utilisation at the second user terminal, and the at least one known value comprises a downlink bandwidth capacity at the second user terminal, and wherein the communication client application is configured to determine to add a further connection if the downlink bandwidth utilisation at the second user terminal is less than the downlink bandwidth capacity at the second user terminal.

23. A user terminal as claimed in claim 18, wherein the at least one network parameter comprises a time elapsed since the transmission of the data started, and the at least one known value comprises a predetermined time interval, and wherein the communication client application is configured to determine to add a further connection if the time elapsed since the transmission of the data started equals or exceeds the predetermined time interval.

24. A user terminal according to claim 18, wherein the operations further include determining whether throughput of the transmitted data has increased relative to the throughput before establishing the further connection.

25. A user terminal according to claim 18, wherein the first and second relay nodes are further user terminals, each executing the communication client application.

26. A user terminal according to claim 18, wherein said distributing transmission of the data comprises interleaving transmission of the data between the first connection and the further connection.

27. A user terminal according to claim 18, wherein said distributing transmission of the data comprises at least one of:
alternating back and forth between sending packets of the portions of the data via the first connection and sending packets of the different portions of the data via the further connection; or
alternating back and forth between sending frames of the portions of the data via the first connection and sending frames of the different portions of the data via the further connection.

28. A user terminal according to claim 18, wherein the communication network is a peer-to-peer system operating on the internet.

* * * * *